(12) United States Patent
Kaneko

(10) Patent No.: US 9,536,172 B2
(45) Date of Patent: Jan. 3, 2017

(54) IMAGE PROCESSING APPARATUS, IMAGE PROCESSING METHOD, AND STORAGE MEDIUM FOR CHECKING AN EXPOSURE STATE OF CAPTURED IMAGE DATA

(71) Applicant: CANON KABUSHIKI KAISHA, Tokyo (JP)

(72) Inventor: Chiaki Kaneko, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/618,358

(22) Filed: Feb. 10, 2015

(65) Prior Publication Data

US 2015/0243050 A1 Aug. 27, 2015

(30) Foreign Application Priority Data

Feb. 26, 2014 (JP) ................. 2014-035843
Jan. 21, 2015 (JP) ................. 2015-009746

(51) Int. Cl.
*G06K 9/00* (2006.01)
*G06K 9/46* (2006.01)
*G06T 5/00* (2006.01)
*G06T 5/40* (2006.01)
*G06K 9/40* (2006.01)
*G06T 7/00* (2006.01)

(52) U.S. Cl.
CPC ............. *G06K 9/4661* (2013.01); *G06K 9/40* (2013.01); *G06K 9/4642* (2013.01); *G06T 5/002* (2013.01); *G06T 5/40* (2013.01); *G06T 7/0044* (2013.01); *G06T 2207/10016* (2013.01); *G06T 2207/10024* (2013.01); *G06T 2207/20021* (2013.01); *G06T 2207/20076* (2013.01); *G06T 2207/20104* (2013.01); *G06T 2207/30204* (2013.01)

(58) Field of Classification Search
None
See application file for complete search history.

(56) References Cited

U.S. PATENT DOCUMENTS 5,822,453 A * 10/1998 Lee .................. H04N 1/4074
382/168
6,097,470 A * 8/2000 Buhr ................ H04N 1/6094
355/38
6,226,050 B1 * 5/2001 Lee .................. H04N 5/21
348/607

(Continued)

FOREIGN PATENT DOCUMENTS

JP 2008-172732 A 7/2008

*Primary Examiner* — Wenpeng Chen
(74) *Attorney, Agent, or Firm* — Carter, DeLuca, Farrell & Schmidt, LLP

(57) ABSTRACT

To make it possible to accurately grasp an exposure state even in the case where noise is included in captured image data. An input image data acquisition unit configured to acquire input image data including a chart, a noise reduction unit configured to perform noise reduction on the input image data, and a histogram generation unit configured to generate a histogram of luminance of the input image data based on noise reduced image data are included, and the noise reduction unit performs noise reduction on the chart area of the input image data in a degree greater than that in which noise reduction is performed on an area other than the chart.

8 Claims, 10 Drawing Sheets

(56) References Cited

U.S. PATENT DOCUMENTS

| | | | | |
|---|---|---|---|---|
| 6,650,774 B1* | 11/2003 | Szeliski | | G06T 5/008 348/225.1 |
| 7,929,771 B2* | 4/2011 | Ko | | G06K 9/00234 345/419 |
| 8,120,679 B2* | 2/2012 | Ishiga | | G06T 5/002 348/241 |
| 8,339,484 B2* | 12/2012 | Ishiga | | G06T 5/002 348/241 |
| 8,731,323 B2* | 5/2014 | Wang | | H04N 19/86 382/190 |
| 2004/0001643 A1* | 1/2004 | Thesen | | G06T 5/004 382/260 |
| 2004/0017938 A1* | 1/2004 | Cooper | | G06K 9/00228 382/171 |
| 2006/0082665 A1* | 4/2006 | Mizukura | | H04N 9/045 348/272 |
| 2006/0274936 A1* | 12/2006 | Ohkubo | | G06K 9/00234 382/167 |
| 2007/0031041 A1* | 2/2007 | Ko | | G06K 9/00234 382/190 |
| 2009/0309998 A1* | 12/2009 | Grosvenor | | G06T 5/40 348/241 |
| 2010/0066874 A1* | 3/2010 | Ishiga | | G06T 5/002 348/252 |
| 2010/0284614 A1* | 11/2010 | Xu | | G06T 1/00 382/167 |
| 2010/0322513 A1* | 12/2010 | Xu | | G06T 5/20 382/167 |
| 2011/0142338 A1* | 6/2011 | Do | | G06K 9/00362 382/165 |
| 2011/0188773 A1* | 8/2011 | Wei | | G06K 9/40 382/260 |
| 2012/0147225 A1* | 6/2012 | Ishiga | | G06T 5/002 348/242 |
| 2013/0128122 A1* | 5/2013 | Wang | | H04N 19/86 348/607 |
| 2014/0079319 A1* | 3/2014 | Lin | | G06T 5/007 382/167 |
| 2014/0177955 A1* | 6/2014 | Srinivasan | | G06K 9/00375 382/165 |
| 2015/0125074 A1* | 5/2015 | Yu | | G06T 7/408 382/164 |
| 2015/0160839 A1* | 6/2015 | Krishnaswamy | | G06F 3/04845 715/810 |

* cited by examiner

IMAGE PROCESSING APPARATUS, IMAGE PROCESSING METHOD, AND STORAGE MEDIUM FOR CHECKING AN EXPOSURE STATE OF CAPTURED IMAGE DATA

BACKGROUND OF THE INVENTION

Field of the Invention

The present invention relates to visualization of image information for checking an exposure state of captured image data.

Description of the Related Art

As one method of visualizing information on exposure of captured image data, the histogram display technique is known as a conventional technique. The histogram display technique makes it possible to visually check a distribution state of luminance values in captured image data by plotting the luminance values that occur in the captured image data on a two-dimensional plane on which, for example, the horizontal axis represents the luminance value and the vertical axis represents the frequency.

Japanese Patent Laid-Open No. 2008-172732 has disclosed a method of displaying a histogram in a size in accordance with a detected area by detecting the area of a main subject of interest in image data in order to determine whether the exposure of the main subject of interest is appropriate.

However, captured image data generally includes noise even though noise reduction processing is performed on the captured image data. Because of this, by the method described in Patent document 1, the generated histogram is affected by noise and there is a case where it is difficult to check the exposure state.

In view of the above, an object of the present invention is to generate a histogram for accurately grasping an exposure state of captured image data.

SUMMARY OF THE INVENTION

According to the present invention, even in the case where noise is included in captured image data, it is possible to accurately grasp an exposure state.

The image processing apparatus according to the present invention includes: an input image data acquisition unit configured to acquire input image data that is obtained by capturing an image including a chart as part of a subject; a noise reduction unit configured to perform noise reduction on the input image data; and a histogram generation unit configured to generate a histogram of color of the input image data based on noise reduced image data, wherein the histogram is generated based on image data in which noise reduction has been performed on the chart area of the input image data in a degree greater than that in which noise reduction has been performed on an area other than the chart.

Further features of the present invention will become apparent from the following description of exemplary embodiments (with reference to the attached drawings).

BRIEF DESCRIPTION OF THE DRAWINGS

FIGS. 5A to 5C are diagrams showing examples of histograms in the case where input image data includes noise, wherein FIG. 5A shows a histogram in the case where noise reduction is not performed, FIG. 5B shows a histogram in the case where noise reduction is performed uniformly, and FIG. 5C shows a histogram in the case where noise reduction is performed only on the chart area, respectively;

DESCRIPTION OF THE EMBODIMENTS

Hereinafter, with reference to the attached drawings, the present invention is explained in detail in accordance with preferred embodiments. A configuration shown in the following embodiment is just an example and the present invention is not limited to the illustrated configuration.

[First Embodiment]

Figure 1:
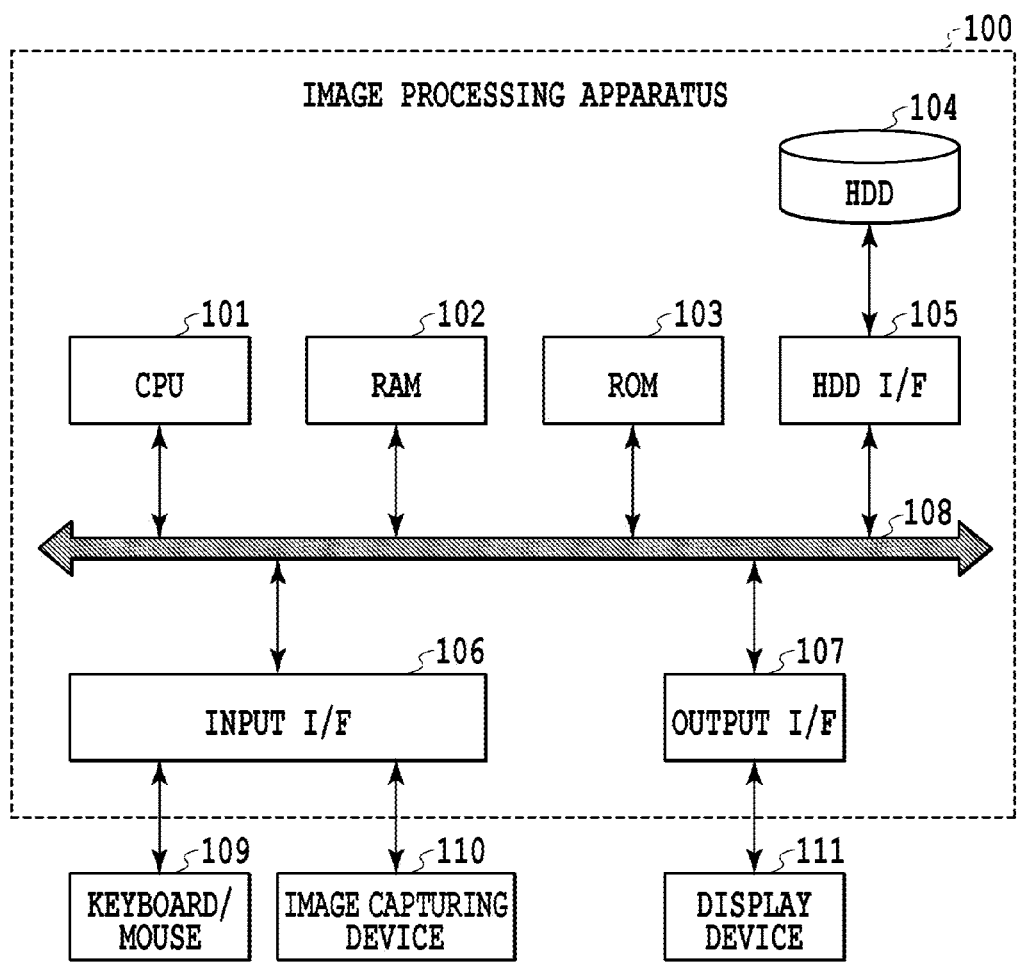
FIG. 1 is a diagram showing an internal configuration of an image processing apparatus.

FIG. 1 is a diagram showing an internal configuration of an image processing apparatus according to the present embodiment.

An image processing apparatus 100 includes a CPU 101, a RAM 102, a ROM 103, a hard disk drive (HDD) 104, an HDD I/F 105, an input I/F 106, an output I/F 107, and a system bus 108.

The CPU 101 executes programs stored in the ROM 103 and the HDD 104 by using the RAM 102 as a work memory and comprehensively controls each unit, to be described later, via the system bus 108. Due to this, various kinds of processing, to be described later, is performed.

The HDD I/F 105 is an interface, for example, such as the serial ATA (SATA), and connects the HDD 104 as a secondary storage device. It is possible for the CPU 101 to read data from the HDD 104 and to write data to the HDD 104 via the HDD I/F 5. Further, it is also possible for the CPU 101 to develop data stored in the HDD 104 onto the RAM 102 and to similarly save data developed onto the RAM 102 in the HDD 104. Then, it is possible for the CPU 101 to regard the data developed onto the RAM 102 as a program and to execute the program. The secondary storage device may be a storage device such as an optical disk drive, other than the HDD.

The input I/F 106 is, for example, a serial bus interface, such as USB and IEEE1394. The input I/F 106 connects an input device 109, such as a keyboard and a mouse, and an image capturing device 110 such as a digital video camera. It is possible for the CPU 101 to acquire various kinds of data from various input devices and image capturing devices via the input I/F 106.

The output I/F 107 is, for example, a video output interface, such as DVI and HDMI, and connects a display device 111 such as a liquid crystal display. It is possible for the CPU 101 to send data to the display device 111 via the output I/F 107 and to cause the display device 111 to produce a display.

Figure 2:
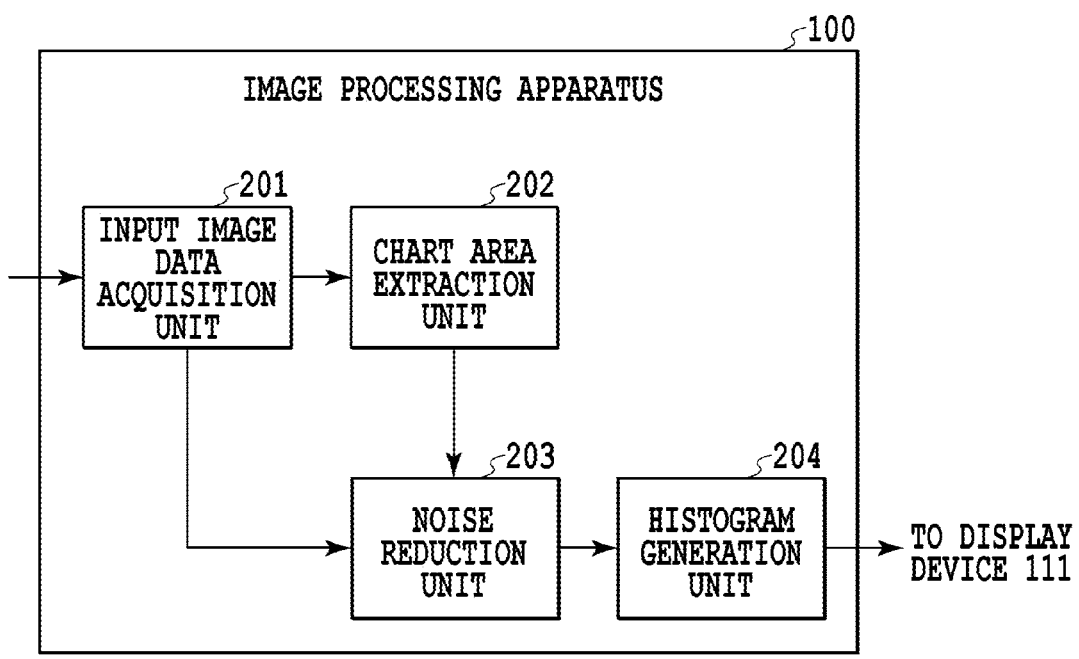
FIG. 2 is a function block diagram of an image processing apparatus according to a first embodiment.

FIG. 2 is a function block diagram of the image processing apparatus 100 according to the present embodiment. The image processing apparatus 100 has an input image data acquisition unit 201, a chart area extraction unit 202, a noise reduction unit 203, and a histogram generation unit 204.

By each of these units, noise reduction is performed on input image data in such a manner that the degree of noise reduction that is performed on an area in which a chart is photographed is different from that of noise reduction that is performed on the other area. Then, based on the image data after the noise reduction, a histogram of luminance of input image data (hereinafter, simply referred to as a "histogram") is generated. An outline of each unit is as follows.

The input image data acquisition unit 201 acquires input image data that is a target of processing from a secondary storage device, such as the image capturing device 110 and the HDD 104. The input image data is data of an image that is captured so as to include a subject for the use as a chart. In the present embodiment, it is assumed that an 18% gray board is used as a chart. However, the chart is not limited to this. Any subject may be used as a chart as long as it does not include a pattern or texture and it has an area in which a color is uniform to a certain extent. For example, it may also be possible to use a color chart other than the 18% gray board or to design a configuration in which the chart area is extracted by regarding part of a subject (e.g., the skin of a person) as a chart. The acquired input image data is sent to the chart area extraction unit 202 and the noise reduction unit 203.

The chart area extraction unit 202 performs processing to extract the chart area based on color information (in the present embodiment, luminance information) on the input image data that is received from the input image data acquisition unit 201. The extraction results (information for specifying the chart area and the other area) are sent to the noise reduction unit 203

The noise reduction unit 203 performs predetermined noise reduction in accordance with the extraction results of the chart area extraction unit 202 on the input image data that is received from the input image data acquisition unit 201. The image data obtained by the noise reduction (hereinafter, corrected image data) is sent to the histogram generation unit 204.

The histogram generation unit 204 generates a histogram by plotting luminance values of pixels included in the corrected image data that is received from the noise reduction unit 203.

Figure 3:
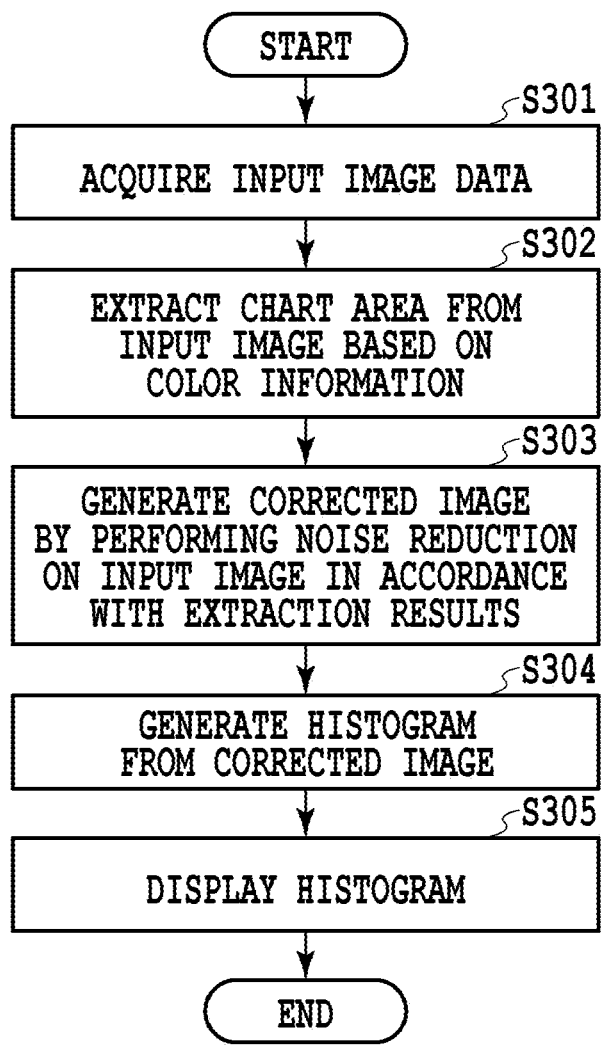
FIG. 3 is a flowchart showing a flow of a series of processing in the image processing apparatus according to the first embodiment.

FIG. 3 is a flowchart showing a flow of a series of processing in the image processing apparatus 100 according to the present embodiment. The series of processing shown in FIG. 3 is implemented by the CPU 101 executing computer executable programs in which the procedures shown below are described after reading the programs from the ROM 103 or the HDD 104 onto the RAM 102.

At step 301, the input image data acquisition unit 201 acquires input image data that is a target of processing from the image capturing device 110 via the input I/F 106 or from the secondary storage device such as the HDD 104 via the HDD I/F 105. In the case where the input image data is, for example, moving image data, image data that is a target of processing is acquired for each frame. The acquired input image data is sent to the chart area extraction unit 202 and the noise reduction unit 203.

At step 302, the chart area extraction unit 202 extracts the chart area from the input image data, which is acquired at step 301, based on the luminance information as color information. Specifically, first, the input image data is divided into block areas having a predetermined size (for example, a size ⅛ of that of the input image data). Next, from among a plurality of block areas obtained by the division, a block area whose representative luminance value is within a predetermined threshold value range is extracted as the chart area. As the representative luminance value, for example, a value that represents the luminance value of the pixel in each block area, such as a median and a mean value of the luminance values within the block area, is used. It may also be possible to determine the predetermined threshold value in accordance with the subject set as the chart in advance. In the present embodiment, the above-described predetermined threshold value range is determined based on a distribution of the representative luminance values in view of the reflectance of the chart that is used. In the case where the 18% gray board is used as the chart, it is expected that the luminance values of the chart on the input image data are distributed substantially in the vicinity of the center of the luminance range of the entire scene. Consequently, the predetermined threshold value range in this case is set to

[mean value of representative luminance values]±[standard deviation of representative luminance values]. The extraction results of the chart area are sent to the noise reduction unit 203.

At step S303, the noise reduction unit 203 generates corrected image data by performing, on the input image data acquired at step 301, noise reduction in accordance with the extraction results of the chart area obtained at step 302. At this time, the degree of the noise reduction (smoothing) for the chart area is made greater than the degree of the noise reduction for the area other than the chart. The degree of noise reduction is adjusted by using, for example a median filter, and by changing the filter diameter. Specifically, in the case where the pixel of interest is not included in the chart area, a comparatively small filter diameter R0 (e.g., 3×3) is used so as to prevent details of an image from being crushed. In the present embodiment, for the area other than the chart, noise reduction that is applied in order to use the captured image data as a final video or display is performed. Due to this, it is made easier for an editor etc. to adjust the exposure of the entire image at the time of actually using the target image as a video or display by using the exposure state of the gray chart as a reference. In this case, however, the degree of noise reduction is made comparatively less great in view of the preservation of the luminance range on the image, and therefore, a certain amount of noise remains in the noise reduced image data. On the other hand, in the case where the pixel of interest is included in the chart area, a comparatively large filter diameter R1 (e.g., 7×7) is used so that the luminance value within the area is as constant as possible to reduce the influence of noise as much as possible. In this manner, smoothing processing is applied to input image data by using different filter diameters for the chart area and the other area. It may also be possible to determine the filter diameter R1, which is used in noise reduction for the chart area, in accordance with the size of the chart area. Further, it may also be possible to set the filter diameter R0, which is used in noise reduction for the area other than the chart, to 0 so that noise reduction is not performed. The corrected image data on which the noise reduction in accordance with each area has been performed is sent to the histogram generation unit 204.

Figures 4A, 4B:
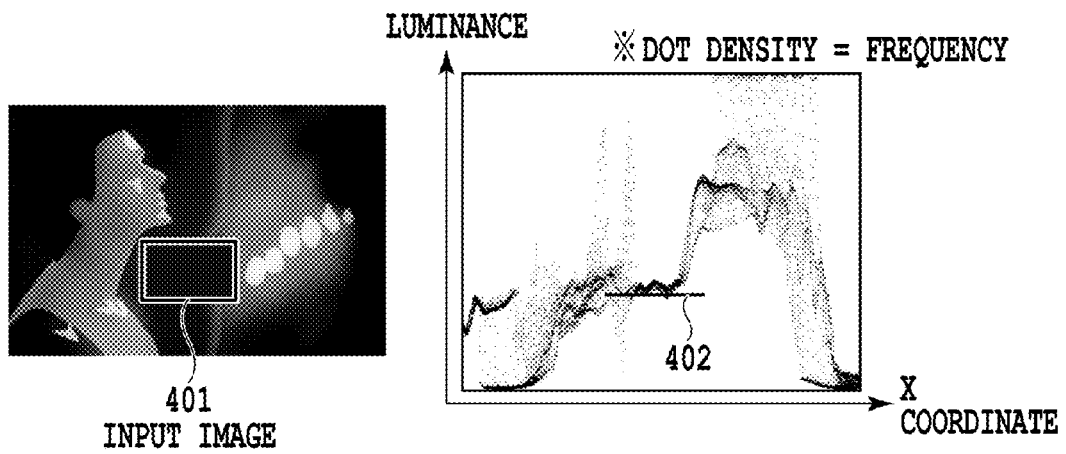
FIGS. 4A and 4B are diagrams showing ideal input image data without noise and an example of a histogram in such a case, respectively.
Figure 5A:
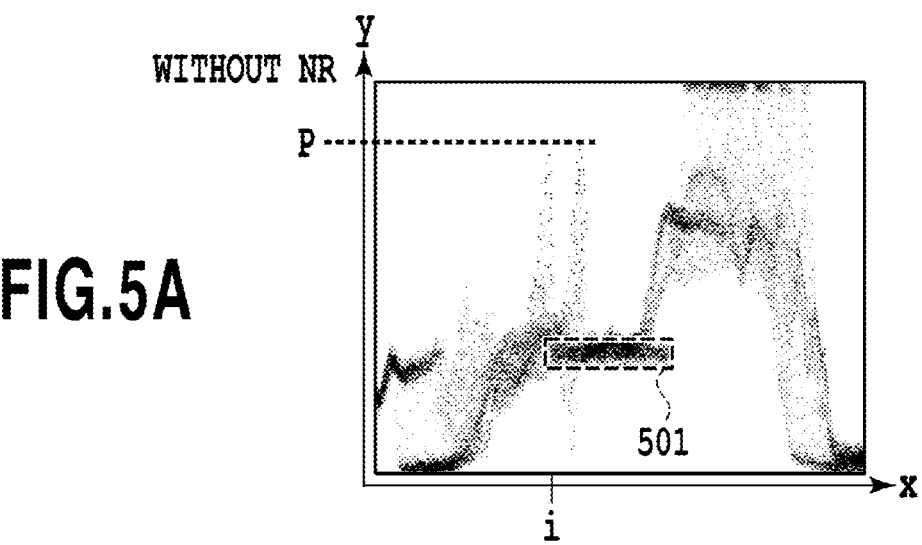
Figure 5B:
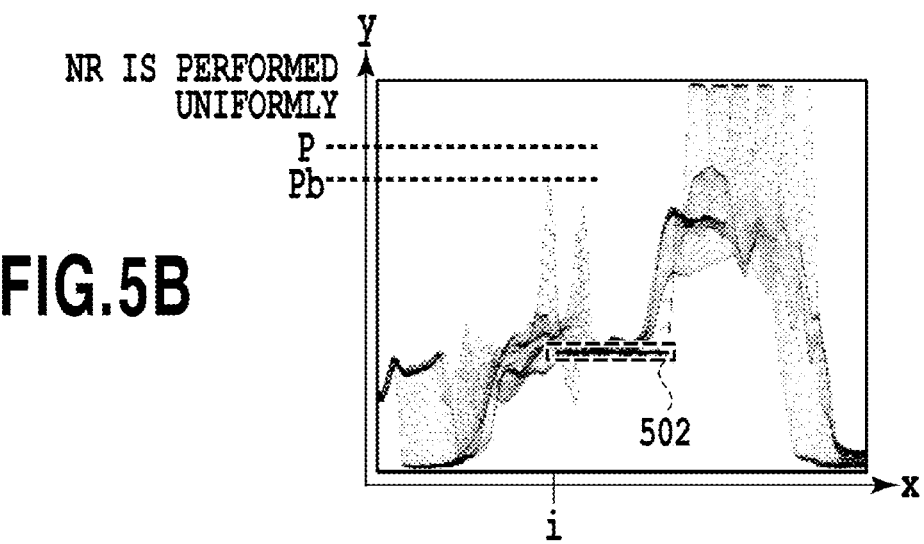
Figure 5C:
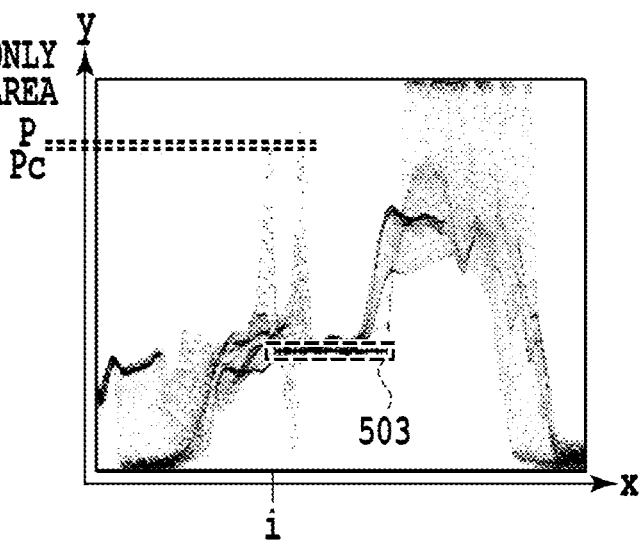

At step 304, the histogram generation unit 204 generates a histogram from the corrected image data obtained at step 303. Here, with reference to FIG. 4 and FIG. 5, the histogram that is generated at this step is explained. FIG. 4 shows ideal input image data without noise and a histogram in this case. In the input image data shown in FIG. 4A, a chart 401 is arranged and in the histogram shown in FIG. 4B, a luminance distribution 402 of the chart 401 is displayed in a shape that can be grasped accurately. On the other hand, FIG. 5 shows histograms obtained by performing or not performing noise reduction, respectively, in the case where the input image data includes noise. In detail, FIG. 5A shows a histogram that is generated from the input image data itself, FIG. 5B shows a histogram that is generated from the image data after noise reduction has been performed on the entire input image data in a uniform degree, and FIG. 5C shows a histogram that is generated from the above-described corrected image data, respectively. Desirably, the histogram in the chart area has luminance values that fall within a certain fixed range so as to grasp which luminance value the color of the subject that is used as a chart is converted into. However, as shown in FIG. 5A, in the data of an image that is obtained by actually capturing an image, noise is included and it is known that the luminance values in the chart area are not in a range that has a fixed width, but form a group of points . In the image data obtained by performing noise reduction in a uniform degree on the entire input image data, or in the corrected image data that is generated at step 303, noise has been reduced sufficiently for the pixel value in the chart area. Because of this, it is known that the shapes of luminance distributions 502 and 503 in the histograms in FIGS. 5B and 5C are close to the shape of the luminance distribution 402 in FIG. 4B (the magnitude of disturbance is small compared to that in the shape of a luminance distribution 501 in FIG. 5A). On the other hand, in the area other than the chart, desirably, the change in luminance in image data is left in order to correctly grasp the gradation in the highlight part and the shadow part. In the corrected image data that is generated at step 303, the luminance range is preserved for the area other than the chart and details in the image data are left, and therefore, there is no crush of the peak in the highlight part or the shadow part compared to the histogram in the case where noise reduction is performed uniformly (FIG. 5B). This is also understood from the fact that, while a peak value Pb in the case where noise reduction is performed uniformly is reduced considerably with respect to a peak value P of the input image data at a coordinate i, a peak value Pc in the corrected image data described above is substantially the same as the peak value P.

The data of the histogram that is generated in this manner is sent to the display device 111 via the output I/F 107 and is displayed on the display device 111 (step 305).

By performing the above processing on the series of input image data that is acquired from the image capturing device 110 etc., it is made possible to obtain a histogram by which the exposure state of the entire scene is easily checked even in the case where noise is included in captured image data. Particularly, in the field of cinema production, images are captured by arranging a gray chart that serves as a reference of lightness within the scene the images of which are to be captured. After checking the luminance of the gray chart by watching the luminance histogram related to the captured image data that is obtained at this time, the luminance distribution of the highlight part and the shadow part in which deterioration in image quality, such as blown out highlights and blocked up shadows, is likely to occur is further checked. Because of this, as described previously, in the case where the shape of the histogram of the chart area is disturbed due to the influence of noise, it is difficult to grasp the exposure state by the chart that is used as a reference. On the other hand, in the case where the luminance distribution of the highlight part and the shadow part in the area other than the chart are not preserved as a result of noise reduction, it is not possible to check the highlight part and the shadow part of an image that is used in a cinema. Consequently, as in the present embodiment, by performing noise reduction processing in different intensities on the chart area and on the area other than the chart, image data by which the exposure state can be checked more appropriately is provided.

In the present embodiment, the example in which the median filter is used for noise reduction at step 303 is explained, but it may also be possible to apply the publicly-known method, such as the moving-average method and the bilateral filter, in place of the median filter. The essence of the present embodiment is to increase the degree of smoothing in the chart area than that in the area other than the chart and as long as this is guaranteed, for example, it may also be possible to apply smoothing processing to the chart area and different smoothing processing to the other area.

Further, it may also be possible to design the configuration so that preview displays of the input image data before noise reduction, of the corrected image data after noise reduction, of the image data generated by performing another image processing on the captured image data, etc., are produced along with the display of the histogram.

In the present embodiment, the block size in the area division of input image data is fixed to a predetermined size at step 302, but it may also be possible to make the block size variable in accordance with image capturing conditions. At this time, it is desirable to set the block size to a size smaller than the size of the chart on the input image data in accordance with the angle of view of the image capturing device 110, the size of the chart, and the distance from the image capturing device 110 to the chart. Further, it may also be possible to perform area division based on the luminance value of the input image data.

At step 302 in the present embodiment, the chart area is extracted by using luminance information, but it may also be possible to extract by using color information other than luminance. Further, in the case where the chart area is extracted, it may also be possible to use a user input via the input I/F 106 as auxiliary information. For example, it may also be possible to extract a specific area specified by a user on the image data as the chart area. Furthermore, it may also be possible to design the configuration so that a predetermined threshold value range at the time of the extraction of the chart area is determined based on the pixel value specified by a user.

The noise reduction unit 203 in the present embodiment is explained by using the configuration in which the degree of noise reduction is changed in accordance with the area as an example. As described previously, priority should be given to a sufficient reduction in noise than to preservation of the luminance range in the chart area in the image data, and it is necessary to take into consideration the preservation of the luminance range in the area other than the chart even in the case where noise remains. Consequently, it may also be possible to design a configuration in which the noise reduction unit 203 performs noise reduction on the entire input image data by using two parameters different in degree and outputs two pieces of corrected image data. In this case, it may be possible for the histogram generation unit 204 to receive the extraction results by the chart area extraction unit 202 and to generate a histogram after combining the two pieces of corrected image data in accordance with the area. Alternately, it may also be possible for the histogram generation unit 204 to combine the histograms for each pixel position in accordance with the extraction results of the chart area extraction unit 202 after generating the histogram corresponding to each piece of the corrected image data.

[Second Embodiment]

In the first embodiment, the aspect is explained in which the histogram of input image data is generated by extracting the chart area from the input image data based on the color information and by using the corrected image data obtained by having smoothed the extracted chart area in a great degree compared to that in which the other area has been smoothed. Next, an aspect is explained as a second embodiment, in which a histogram of the entire input image data is obtained by extracting the chart area based on the position information on the chart, removing the influence of noise from the partial histogram, and combining this partial histogram with another partial histogram of the area other than the chart. Explanation of the portions in common to those of the first embodiment is omitted or simplified and in the following, different points are explained mainly.

Figure 6:
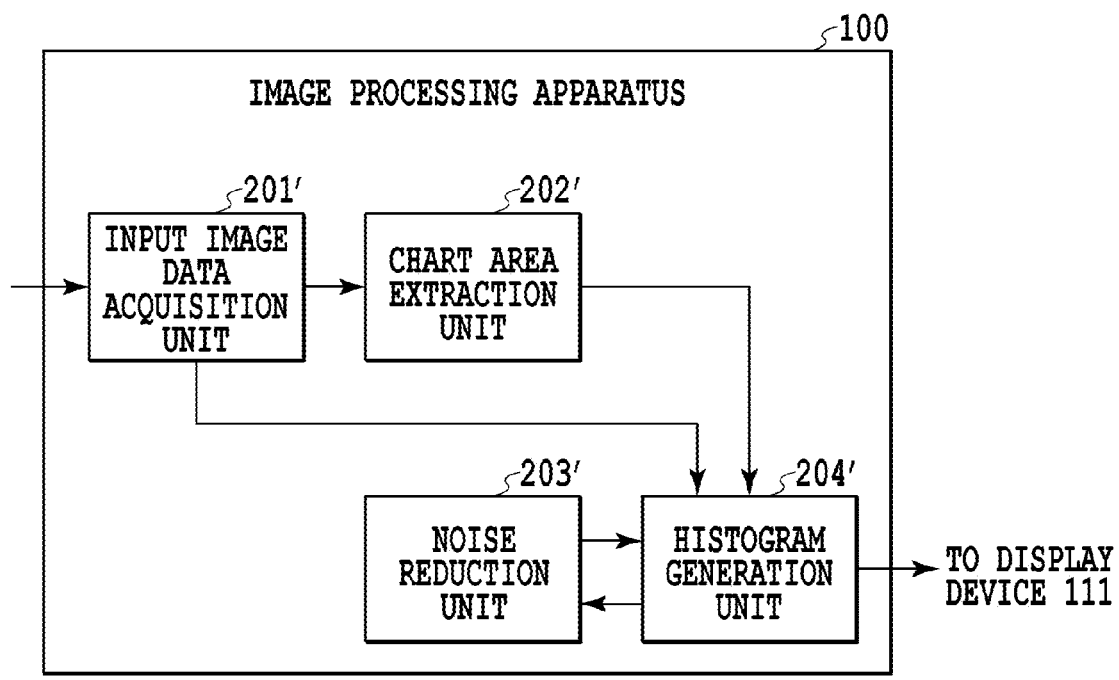
FIG. 6 is a function block diagram of an image processing apparatus according to a second embodiment.

FIG. 6 is a function block diagram of the image processing apparatus 100 according to the present embodiment.

The image processing apparatus 100 includes an input image data acquisition unit 201', a chart area extraction unit 202', a noise reduction unit 203', and a histogram generation unit 204'. An outline of each unit is as follows.

The input image data acquisition unit 201' acquires input image data, which is a target of processing, from the secondary storage device, such as the image capturing device 110 and the HDD 104. The acquired input image data is sent to the chart area extraction unit 202' and the histogram generation unit 204'.

The chart area extraction unit 202' performs processing to extract the chart area based on the position information on the chart on the input image data received from the input image data acquisition unit 201'. To the chart that is used in the present embodiment, a marker is attached as position information for specifying its position and it is assumed that the feature of the marker (color or shape) and relative geometric information on the chart with respect to the marker are stored in advance in the HDD 104 etc. The results of the extraction processing are sent to the histogram generation unit 204'.

The histogram generation unit 204' generates a histogram for each area (hereinafter, a partial histogram) based on the extraction results received from the chart area extraction unit 202'. The partial histogram corresponding to the chart area of the generated partial histograms is sent to the noise reduction unit 203'. Further, the histogram generation unit 204' generates a histogram of the entire input image data (hereinafter, an entire histogram) by combining the corrected partial histogram corresponding to the chart area and the partial histogram corresponding to the area other than the chart.

The noise reduction unit 203' performs noise reduction on the partial histogram corresponding to the chart area received from the histogram generation unit 204'. The partial histogram on which noise reduction has been performed (hereinafter, a corrected partial histogram) is sent to the histogram generation unit 204'.

Figure 7:
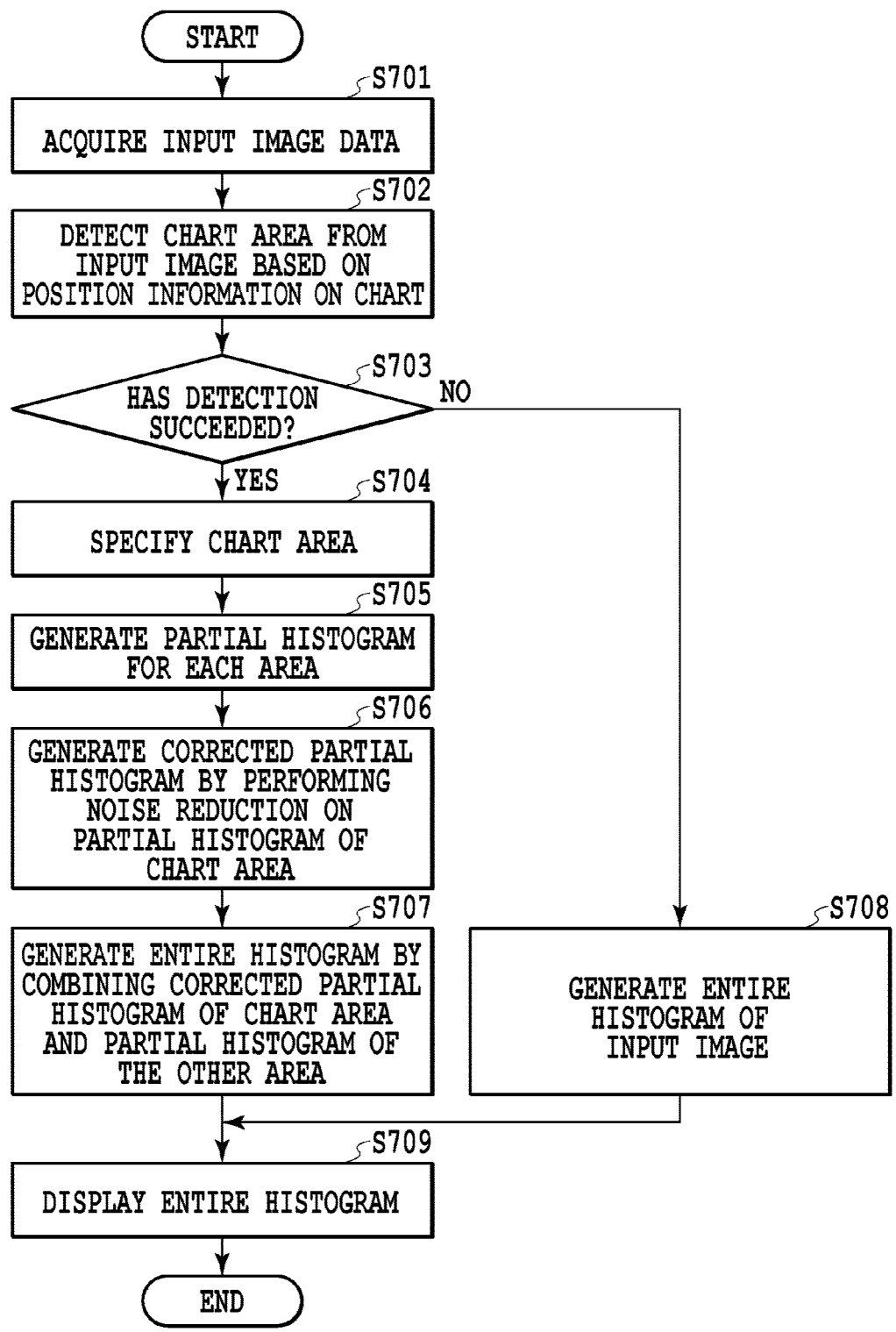
FIG. 7 is a flowchart showing a flow of a series of processing in the image processing apparatus according to the second embodiment.

FIG. 7 is a flowchart showing a flow of a series of processing in the image processing apparatus 100 according to the present embodiment.

At step 701, the input image data acquisition unit 201' acquires input image data in the same manner as that at step 301 of the first embodiment. As described above, in the present embodiment, the acquired input image data is sent to the chart area extraction unit 202' and the histogram generation unit 204'.

At step 702, the chart area extraction unit 202' tries to detect the chart area from the input image data acquired at step 701. Specifically, the chart area extraction unit 202' performs template matching by referring to the feature of the markers stored in the HDD 104 etc.

At step 703, the chart area extraction unit 202' determines whether the marker detection has succeeded. In the case where the maker detection has succeeded, the processing proceeds to step 704. On the other hand, in the case where the marker detection has failed, the chart area extraction unit 202' determines that the chart is not included in the input image data and the processing proceeds to step 708.

At step 704, the chart area extraction unit 202' specifies the chart area on the input image data based on the position of the detected marker and the geometric information on the chart that is stored in advance.

The processing results at steps 702 to 704 described above are sent to the histogram generation unit 204'. In order to detect the chart area, it is possible to use the publicly-known marker detection technique, besides the template matching. It may also be possible to directly detect the chart area without using a marker by storing the feature of the chart itself in advance. Alternatively, it may also be possible to detect the chart area using an output value of a position sensor by attaching the sensor to the chart in advance in place of a marker. Further, it may also be possible to design the configuration in which any area can be specified by a user input via the input I/F 106 and to determine that the detection has succeeded by specifying the specified area as the chart area.

Figure 8A:
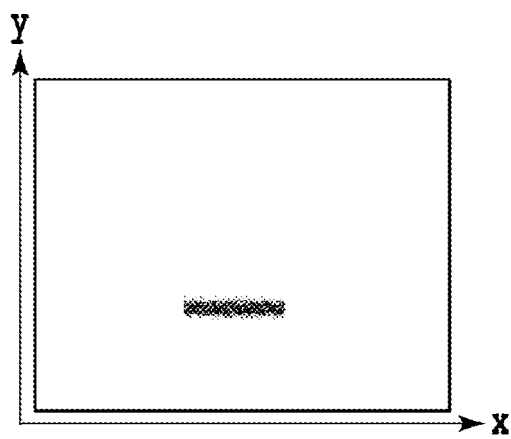
FIGS. 8A and 8B are diagrams showing examples of partial histograms according to the second embodiment.
Figure 8B:
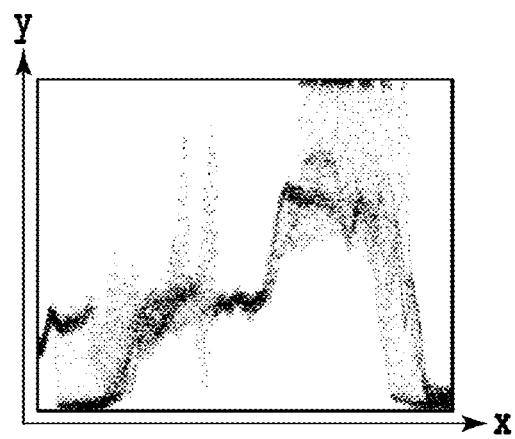

At step 705, the histogram generation unit 204' generates a partial histogram for each area (the chart area and the area other than the chart) specified at step 704 from the input image data acquired at step 701. The partial histogram for each area is generated by plotting the luminance values of the pixels included in each area in the input image data. FIGS. 8A and 8B are each an example of each partial histogram, and FIG. 8A shows the partial histogram corresponding to the chart area and FIG. 8B shows the partial histogram corresponding to the area other than the chart. The partial histogram corresponding to the chart area of the generated partial histograms is sent to the noise reduction unit 203'. Then, the partial histogram corresponding to the area other than the chart is held in the histogram generation unit 204' as it is.

At step 706, the noise reduction unit 203' generates a corrected partial histogram from the partial histogram of the chart area generated at step 705. Specifically, in the case where a frequency at a coordinate x and luminance y of the partial histogram of the chart area is taken to be f (x, y), only the median of the luminance y based on the frequency f (x, y) with respect to each coordinate x is plotted. Due to this, the corrected partial histogram, which is the partial histogram obtained by removing the influence of noise from the partial histogram of the chart area, is obtained. In this case a frequency g (x, y) in the corrected partial histogram can be found by expression (1) below.

$$g(x, y) = \begin{cases} N & y = y_{med}(X) \\ 0 & \text{otherwise} \end{cases} \quad \text{expression (1)}$$

Here, N in the above-described expression (1) is the total sum of the frequencies f (x, y) at a certain coordinate x and $y_{med}$ (x) is the median of the luminance value that satisfies expression (2) below with respect to the coordinate x.

$$\int_{-\infty}^{y_{med}(x)} f(x, y) \, dy \geq \frac{N}{2}$$

and $$\int_{y_{med}(x)}^{\infty} f(x, y) \, dy \geq \frac{N}{2}$$

expression (2)

Figure 9:
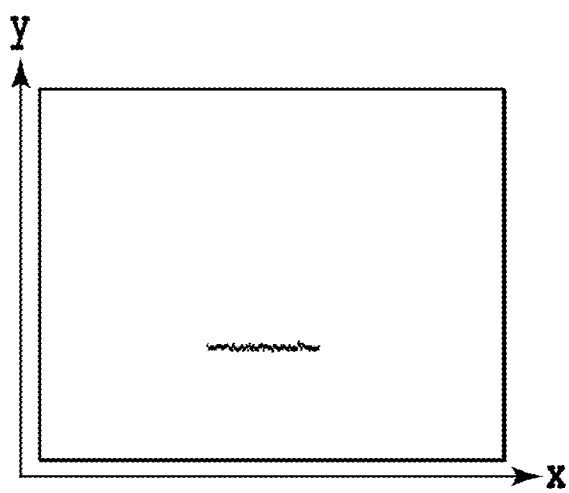
FIG. 9 is a diagram showing an example of a corrected partial histogram according to the second embodiment.

FIG. 9 shows an example of the corrected partial histogram. The example in FIG. 9 shows a highlighted display in which the median $y_{med}$ (x) is plotted in the shape of a longitudinally elongated rectangle. Noise reduction for a histogram is not limited to the above-described example and it is only required for a corrected partial histogram that is generated to represent a peak of the frequency distribution at each coordinate x in the partial histogram. The generated corrected partial histogram is sent to the histogram generation unit 204'.

Figure 10:
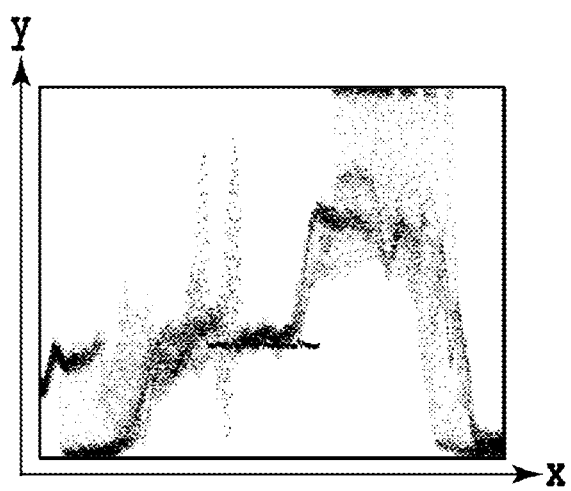
FIG. 10 is a diagram showing an example of an entire histogram according to the second embodiment.

At step 707, the histogram generation unit 204' combines the corrected partial histogram corresponding to the chart area that is generated at step 706 and the partial histogram corresponding to the area other than the chart that is generated and held at step 705. Due to this, the entire histogram, which is a histogram of the entire input image data, is generated. FIG. 10 is a diagram showing an example of the entire histogram and the contents of which are those of the partial histogram shown in FIG. 8B and the corrected partial histogram shown in FIG. 9 combined with each other.

At step 708, the histogram generation unit 204' generates a histogram of the entire input image data acquired at step 701 (entire histogram).

The data of the entire histogram that is generated at step 707 and step 708 is sent to the display device 111 via the output I/F 107 and is displayed on the display device 111 (step 709).

By performing the above processing on the series of input image data that is acquired from the image capturing device 110 etc., it is made possible to obtain a histogram by which the exposure state of the entire scene is easily checked at the same timing as that at which the image of the chart is captured (i.e., the timing at which exposure is adjusted).

It may also be possible to add a configuration in which the data of the corrected partial histogram that is generated at step 706 is fed back to the image capturing device 110 and exposure is controlled so that the luminance of the chart agrees with a target luminance that is determined separately.

[Third Embodiment]

In the first embodiment, the configuration is such that the chart area extraction unit 202 extracts the chart area based the color information and the noise reduction unit 203 performs noise reduction on the input image data. In the second embodiment, the configuration is such that the chart area extraction unit 202' detects the chart area based on the position information on the chart and the noise reduction unit 203' performs noise reduction on the histogram.

The present invention is not limited to those combinations and can also be implemented by, for example, a combination as below. In other words, it may also be possible for the noise reduction unit to perform noise reduction on the input image data after the chart area extraction unit detects the chart area based on the position information on the chart.

Further, it may also be possible for the noise reduction unit to perform noise reduction on the histogram after the chart area extraction unit extracts the chart area based on the color information.

[Fourth Embodiment]

In the first and second embodiments, the example in which the histogram of luminance of the input image data is generated is explained, but the present invention can also be applied to the case where a histogram is generated for another piece of color information, such as color difference components (Cb, Cr components of YCbCr) and each component of RGB, in place of luminance. In this case, it is made possible to obtain a histogram by which it is easy to check the white balance and the saturation state of color components in the scene.

[Other Embodiments]

Embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiment and/or controlling the one or more circuits to perform the functions of one or more of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-035843, filed Feb. 26, 2014, and No. 2015-009746, filed Jan. 21, 2015, which are hereby incorporated by reference wherein in their entirety.

What is claimed is:

1. An image processing apparatus comprising:
   one or more hardware processors; and
   a memory having instructions stored thereon, which, when executed by the one or more hardware processors, cause the image processing apparatus to:
   acquire input image data that is obtained by capturing an image including a chart as part of a subject;
   perform noise reduction on the input image data;
   generate a histogram of color of the input image data based on noise reduced image data; and extract a chart area based on color information on the input image data, wherein the histogram is generated based on image data in which noise reduction has been performed on the chart area of the input image data in a degree greater than that in which noise reduction has been performed on an area other than the chart area, and the input image data is divided into a plurality of areas and an area whose representative luminance value within the area is within a predetermined threshold value range is extracted as the chart area from among a plurality of divided areas.

2. The image processing apparatus according to claim 1, wherein the color information is information on luminance in the input image data.

3. The image processing apparatus according to claim 1, wherein the input image data is data of a captured image including an 18% gray board as the chart, and the predetermined threshold value range is [mean value of representative luminance values]±[standard deviation of representative luminance values].

4. The image processing apparatus according to claim 1, wherein the noise reduction is performed in a degree in accordance with the chart area in the input image data.

5. The image processing apparatus according to claim 4, wherein the noise reduction for the input image data is smoothing processing, and the degree is adjusted by changing a filter diameter of a filter that is used in the smoothing processing.

6. The image processing apparatus according to claim 1, wherein a plurality of pieces of noise reduced image data is output by performing noise reduction in different intensities on the input image data, and the histogram is generated based on the plurality of pieces of noise reduced image data.

7. An image processing method comprising:

acquiring input image data including a chart;

performing noise reduction on the input image data;

generating a histogram of color of the input image data based on the noise reduced image data; and extracting a chart area based on color information on the input image data, wherein performing noise reduction includes performing noise reduction on the chart area of the input image data in a degree greater than that in which noise reduction is performed on an area other than the chart area, and extracting the chart area includes dividing the input image data into a plurality of areas and extracting an area whose representative luminance value within the area is within a predetermined threshold value range as the chart area from among a plurality of divided areas.

8. A non-transitory computer readable storage medium storing a program for causing a computer to perform the method according to claim 7.

* * * * *